United States Patent [19]

Cundill et al.

[11] Patent Number: 5,704,639
[45] Date of Patent: Jan. 6, 1998

[54] PRESSURE SENSITIVE AIRBAG VENT MECHANISM

[75] Inventors: David James Cundill; Stuart James Smith, both of Leicester, England

[73] Assignee: Breed Automotive Technology, Inc., Lakeland, Fla.

[21] Appl. No.: 678,530

[22] Filed: Jul. 9, 1996

[51] Int. Cl.$^6$ ................................................. B60R 21/30
[52] U.S. Cl. ................................................. 280/739
[58] Field of Search ............................... 280/739, 738, 280/743.1, 728.1

[56] References Cited

U.S. PATENT DOCUMENTS

| | | | |
|---|---|---|---|
| 3,451,693 | 6/1969 | Carey | 280/739 |
| 3,511,519 | 5/1970 | Martin | 280/739 |
| 3,527,475 | 9/1970 | Carey et al. | 280/739 |
| 3,573,885 | 4/1971 | Brawn | 280/739 |
| 3,733,091 | 5/1973 | Fleck et al. | 280/150 |
| 3,762,741 | 10/1973 | Fleck et al. | 280/150 |
| 3,820,814 | 6/1974 | Allgaier et al. | 280/150 |
| 3,831,972 | 8/1974 | Allgaier et al. | 280/150 |
| 3,879,057 | 4/1975 | Kawashima et al. | 280/150 |
| 3,887,213 | 6/1975 | Goetz | 280/150 |
| 3,892,425 | 7/1975 | Sakairi et al. | 280/150 |
| 3,937,488 | 2/1976 | Wilson et al. | 280/150 |
| 4,097,065 | 6/1978 | Okada et al. | 280/739 |
| 4,360,223 | 11/1982 | Kirchoff | 280/729 |
| 4,805,930 | 2/1989 | Takada | 280/739 |
| 5,007,662 | 4/1991 | Abramcyk et al. | 280/739 |
| 5,016,913 | 5/1991 | Nakajima et al. | 280/738 |
| 5,056,815 | 10/1991 | Geisreiter | 280/736 |
| 5,073,418 | 12/1991 | Thornton et al. | 428/34.9 |
| 5,131,434 | 7/1992 | Krummheuer et al. | 139/35 |
| 5,178,408 | 1/1993 | Barrenscheen et al. | 280/728 |
| 5,186,488 | 2/1993 | Takano | 280/728 |
| 5,219,179 | 6/1993 | Eyrainer et al. | 280/739 |
| 5,246,250 | 9/1993 | Wolanin et al. | 280/739 |
| 5,310,215 | 5/1994 | Wallner | 280/739 |
| 5,333,903 | 8/1994 | Eyrainer et al. | 280/743 |
| 5,370,925 | 12/1994 | Koseki | 428/225 |
| 5,405,166 | 4/1995 | Rogerson | 280/739 |
| 5,478,111 | 12/1995 | Marchant et al. | 280/739 |
| 5,492,363 | 2/1996 | Hartmeyer et al. | 280/739 |
| 5,496,063 | 3/1996 | Conlee et al. | 280/739 |
| 5,501,488 | 3/1996 | Saderholm et al. | 280/739 |
| 5,518,269 | 5/1996 | Storey et al. | 280/739 |
| 5,533,753 | 7/1996 | Abraham | 280/739 |
| 5,536,038 | 7/1996 | Bollaert et al. | 280/730.2 |
| 5,538,279 | 7/1996 | Link et al. | 280/738 |
| 5,603,526 | 2/1997 | Buchanan | 280/739 |
| 5,634,659 | 6/1997 | Abraham | 280/739 |

FOREIGN PATENT DOCUMENTS

| | | |
|---|---|---|
| 0529371 | 3/1993 | European Pat. Off. . |
| 0536677 | 4/1993 | European Pat. Off. . |
| 0670247 | 6/1995 | European Pat. Off. . |
| 0700808 | 3/1996 | European Pat. Off. . |
| 06286570 | 10/1994 | Japan . |
| 6286569 | 10/1994 | Japan . |
| 9009908 | 9/1990 | WIPO . |

*Primary Examiner*—Paul N. Dickson
*Attorney, Agent, or Firm*—Lonnie R. Drayer

[57] ABSTRACT

An airbag for use in an occupant protection system has a venting mechanism which allows inflation gas to vent from the airbag only after a predetermined inflation pressure is attained. The venting mechanism includes a ventilation opening and a sealing member overlying the opening which inhibits the venting of the inflation gas. The sealing member has a frangible region which remains intact below the predetermined inflation pressure, but which breaks open when the predetermined inflation pressure is exceeded.

18 Claims, 5 Drawing Sheets

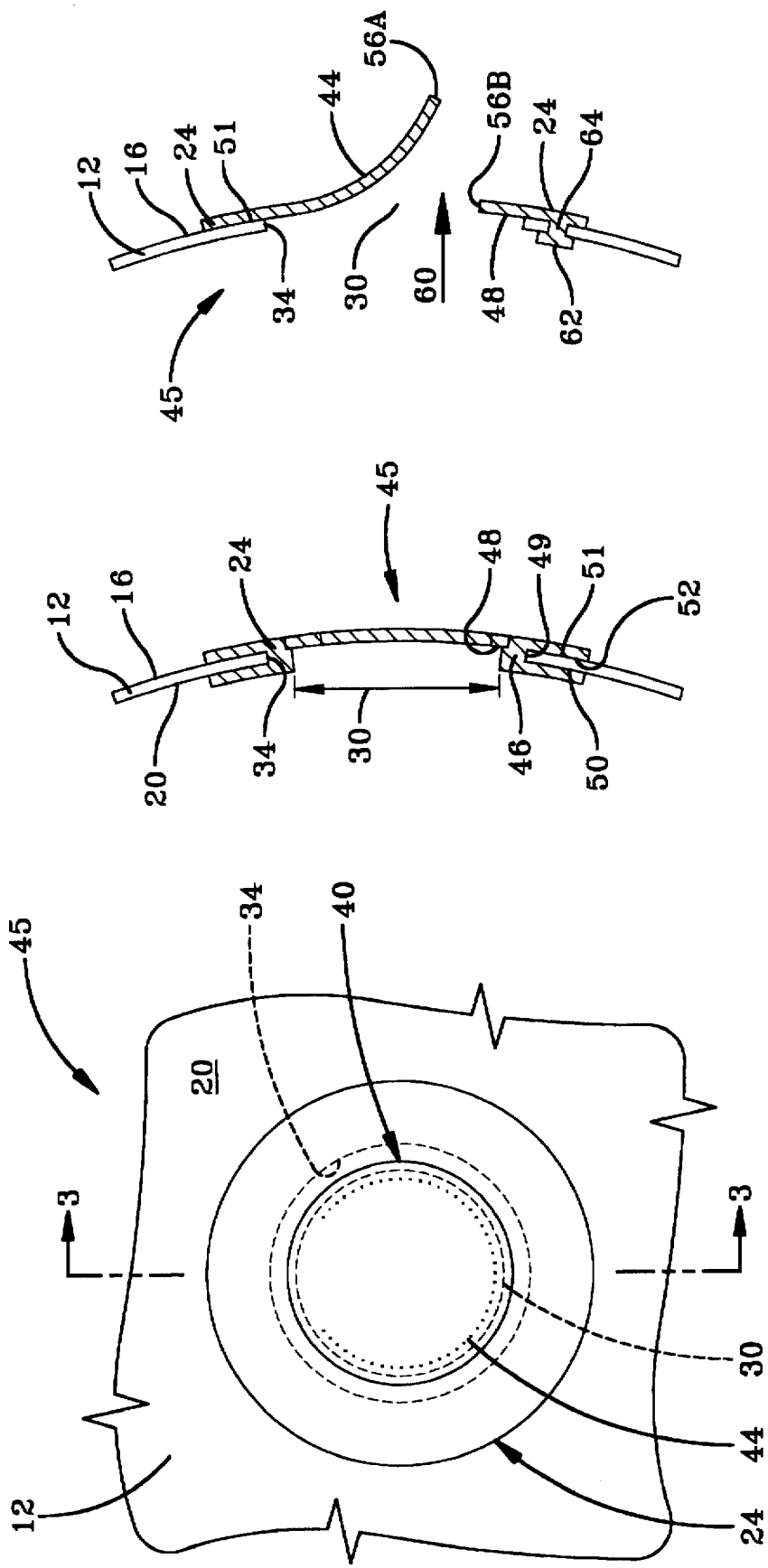

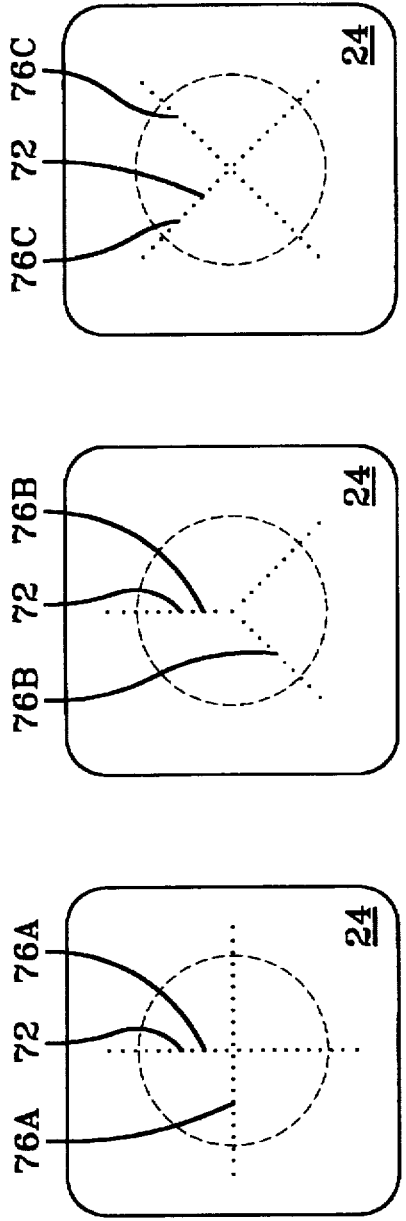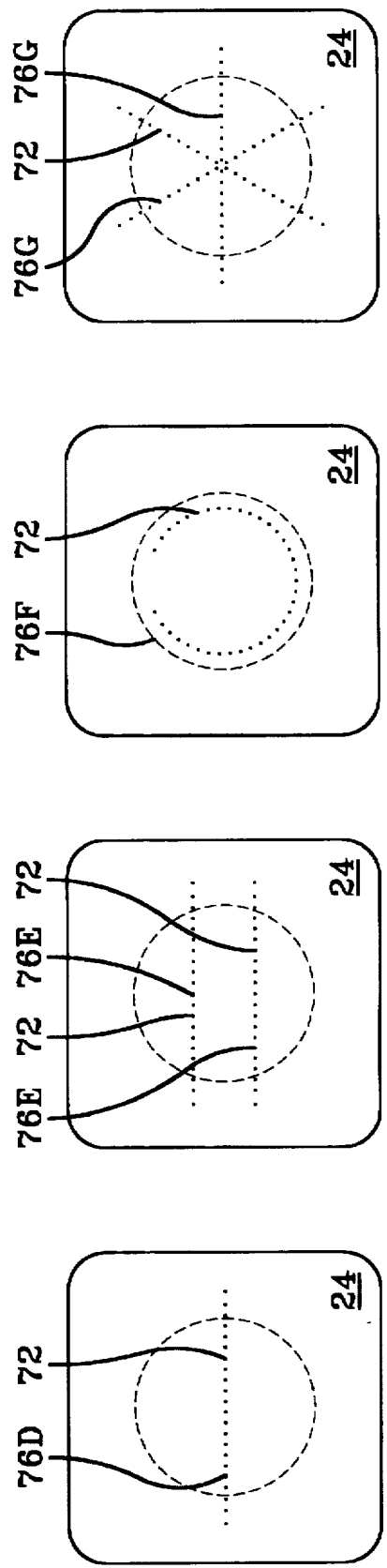

PRESSURE SENSITIVE AIRBAG VENT MECHANISM

The present invention relates to methods and apparatuses for venting an inflation gas from the interior of an airbag, and more specifically to methods and apparatuses for venting an inflation gas after a pre-determined inflation pressure threshold has been reached in the airbag.

BACKGROUND OF THE INVENTION

Many motor vehicles are equipped with vehicle occupant protection systems, which include airbags, to protect a vehicle occupant from injury in the event of a crash. Generally, the airbag is stored in a deflated condition within the steering wheel or a component of the vehicle interior. When the vehicle undergoes rapid deceleration, as occurs during a head-on collision, the airbag rapidly inflates due to the introduction of an inflation gas into the airbag interior. It is usual to provide excess inflation gas to the airbag interior to increase the speed of airbag deployment. The excess inflation gas must be vented in order to enhance the cushioning effect of the airbag upon an occupant and to prevent failure of the airbag when impacted by the forward movement of the occupant.

DESCRIPTION OF THE PRIOR ART

U.S. Pat. No. 3,733,091 teaches an inflatable vehicle occupant restraint which allows only very limited venting of inflation gas from the inflation chamber through what is characterized as approaching a one-way valve for the passage of gas into the inflation chamber.

U.S. Pat. No. 3,762,741 teaches the use of rupturable diaphragm or membrane to provide a "conventional blowout patch" for pressure relief of an inflatable occupant restraint device. However; the actual structure of the rupturable diaphragm or membrane is not disclosed or suggested in U.S. Pat. No. 3,762,741.

U.S. Pat. No. 3,879,057 teaches an inflatable vehicle occupant restraint having an exhaust hole which is normally closed by a blocking member which is connected to a restraining member located inside the airbag, the restraining member being responsive to a force exerted on the airbag by a vehicle occupant to open and close the exhaust hole.

U.S. Pat. No. 3,820,814 teaches the use of a "discharge valve" which controls the effective area of a discharge aperture as a function of the gas pressure inside of an airbag.

U.S. Pat. No. 3,887,213 teaches an inflatable vehicle occupant restraint having a plurality of "blow-off patches" provided on the end wall thereof for preventing rebound upon contact with a vehicle occupant. Upon contact of the inflated member with the vehicle occupant the "vent or patches" retain air in the inflated member until a predetermined level on inflation pressure is obtained, at which pressure level the "patches or vents" open or pop off, to permit immediate escape of air from the inflated member. The particular construction of the vents or patches "will be a matter of choice to those skilled in the art." No structure for the "vents or patches" is disclosed or suggested in this publication except in the drawings, where they appear to be nothing more than flaps.

U.S. Pat. No. 4,097,065 teaches an airbag having a gas permeable patch which at all times allows inflation gas to escape from the airbag, but has a slackening portion to prevent the gas permeable patch from being torn or separated from the airbag material as the inflation pressure increases.

U.S. Pat. No. 4,360,223 teaches a check valve which is used with an inflatable vehicle occupant restraint which has more than one inflation chamber to control pressure differentials between the chambers. This check valve has mating flaps which overly an opening and allow one-way passage of gas therethrough.

U.S. Pat. No. 4,805,930 teaches an airbag structure wherein stitched thread seams between fabric elements extends in response to inflation pressure causing the film coating of the airbag material to rupture along the sem and allow gas to escape and maintain a substantially constant overall maximum inflation pressure.

U.S. Pat. No. 5,016,913 teaches the use of a neat-shrinking material to overly an exhaust opening in an airbag. The heat-shrink material has an opening therein which grows larger when the material shrinks due to the heat of the inflation gas filling the airbag.

U.S. Pat. No. 5,186,488 teaches an airbag having a low strength portion of a seam in the airbag material. A frame shaped reinforcement patch is attached on the inside of the airbag in such a manner as to expose part of the low strength seam, thereby defining a part of the seam of preselected size which will fail when the inflation pressure exceeds a selected level.

U.S. Pat. No. 5,310,215 teaches an airbag having a venting opening with a panel overlying the opening and secured, preferably with stitches, to the airbag material. When gas is vented from the inflation chamber through the venting opening the panel restricts flow of the vented gas away from the vehicle occupant.

U.S. Pat. No. 5,492,363 teaches an airbag with an exhaust valve having inner and outer membranes with a pucker formed therebetween and a flow passage from the inflation chamber to the pucker for expulsion of gas through an outer membrane aperture. The inner membrane is extensible in response to impact of the vehicle occupant withe the airbag which exceeds a threshold value so that the inner and outer membranes are brought together in nested engagement so as to dissipate the pucker.

U.S. Pat. No. 5,518,269 discloses an airbag having a dynamic burn vent where inflation gas can be vented.

EP 0 670 247 A1 teaches an inflatable airbag having an opening therein for venting inflation gas. A panel lies on an outer surface of the airbag and overlies at least a part of the opening. The panel is formed of elastic material so that a portion of the panel may be stretched away from the opening to allow passage of inflation gas therethrough.

JA 06286570 A teaches the use of sheet-like elastic members of rubber or the like overlying the ventilation openings in an airbag, the elastic members having exhaust openings therein which are stretched to larger sizes as the inflation pressure in the airbag increases.

JA 06286569 teaches the use of slender exhaust openings, similar to slits, in the airbag with an elastic member, for example of rubber, extending transversely across the exhaust opening and attached to the airbag material. In the early stages of inflating the airbag the area of the exhaust opening opening is restricted by the elastic member, and the airbag is rapidly expanded in size, but when the inflation pressure reaches a predetermined value the elastic members are stretched and the exhaust openings open wider to allow increased venting of the inflation gas.

SUMMARY OF THE INVENTION

In accordance with the practice of the present invention, there is provided an airbag having a ventilation opening which is sealed prior to the inflation pressure reaching a predetermined level. More particularly, in accordance with the present invention a sealing member, overlying the ventilation opening has a frangible region which breaks open at a predetermined pressure level in order to allow the inflation gas within the airbag to vent.

There is provided in accordance with one aspect of the present invention, an inflatable airbag comprising: airbag material having an outer surface and an inner surface, said inner surface defining an inflation chamber into which inflation gas is directed to inflate the airbag, said airbag material having a ventilation opening therein for venting inflation gas from the inflation chamber; a sealing member extending across and sealing the ventilation opening to inhibit said inflation gas from venting from said inflation chamber, said sealing member having a frangible region located at least partially over said ventilation opening, the frangible region of the sealing member being intact when the inflation pressure in said inflation chamber is below a predetermined level, said frangible region capable of breaking open when the inflation pressure in said inflation chamber equals or exceeds said predetermined level; and, securing means for securing said sealing member to said airbag material.

There is provided in accordance with another aspect of the invention an airbag ventilation mechanism for use with an airbag, said airbag being formed of airbag material and having an outer surface and an inner surface, said inner surface defining an inflation chamber capable of receiving inflation gas for inflating said airbag, said ventilation mechanism comprising: a sealing member extending across and sealing a ventilation opening in the airbag material to inhibit said inflation gas from venting from said inflation chamber, said sealing member having a frangible region at least partially located over said ventilation opening, said frangible region being intact when the inflation pressure in said inflation chamber is less than a predetermined level and said frangible region being broken open when the inflation pressure is equal to or greater than said predetermined level; and, securing means for securing said sealing member to said airbag material.

There is provided in accordance with another aspect of the invention an inflatable airbag comprising: airbag material having an outer surface and an inner surface, said inner surface defining an inflation chamber into which inflation gas is directed to inflate the airbag, said airbag material having a ventilation opening therein for venting inflation gas from the inflation chamber; a plastic sealing member extending across and sealing the ventilation opening to inhibit said inflation gas from venting from said inflation chamber, said plastic sealing member having a frangible region located at least partially over said ventilation opening, the frangible region of the plastic sealing member being intact when the inflation pressure in said inflation chamber is below a predetermined level, said frangible region capable of breaking open when the inflation pressure in said inflation chamber equals or exceeds said predetermined level; and, securing means for securing said plastic sealing member to said airbag material.

There is provided in accordance with yet another aspect of the invention an inflatable airbag comprising: airbag material having an outer surface and an inner surface, said inner surface defining an inflation chamber into which inflation gas is directed to inflate the airbag, said airbag material having a ventilation opening therein for venting inflation gas from the inflation chamber; a plastic sealing member insert molded with said airbag material and extending across and sealing the ventilation opening to inhibit said inflation gas from venting from said inflation chamber, said sealing member having a frangible region located at least partially, over said ventilation opening, the frangible region of the sealing member being intact when the inflation pressure in said inflation chamber is below a predetermined level, said frangible region capable of breaking open when the inflation pressure in said inflation chamber equals or exceeds said predetermined level.

One advantage of the present invention is the unventilated inflation of the airbag. The airbag can attain a useful inflation level more quickly than airbag systems which are vented during inflation.

Another advantage of the present invention is the allowance of airbag ventilation only after a predetermined inflation pressure level is attained. As opposed to prior art airbag ventilation means, a large excess of inflation gas need not be supplied to the airbag to compensate for the gas which vents out while the airbag is inflating.

Another advantage of the present invention is the provision of a venting mechanism which is readily adaptable to current airbag systems.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 2 is a fragmentary plan view of an airbag having a ventilation mechanism according to the invention;

FIG. 3 is a side, cross sectional view of one embodiment of a ventilation mechanism according to the present invention;

FIG. 4 is a side, cross sectional view of another embodiment of a ventilation mechanism in a venting position;

FIGS. 6A–6G are plan views of venting mechanisms according to the present invention showing various arrangements of weakening lines;

DETAILED DESCRIPTION OF THE INVENTION

Figure 1:
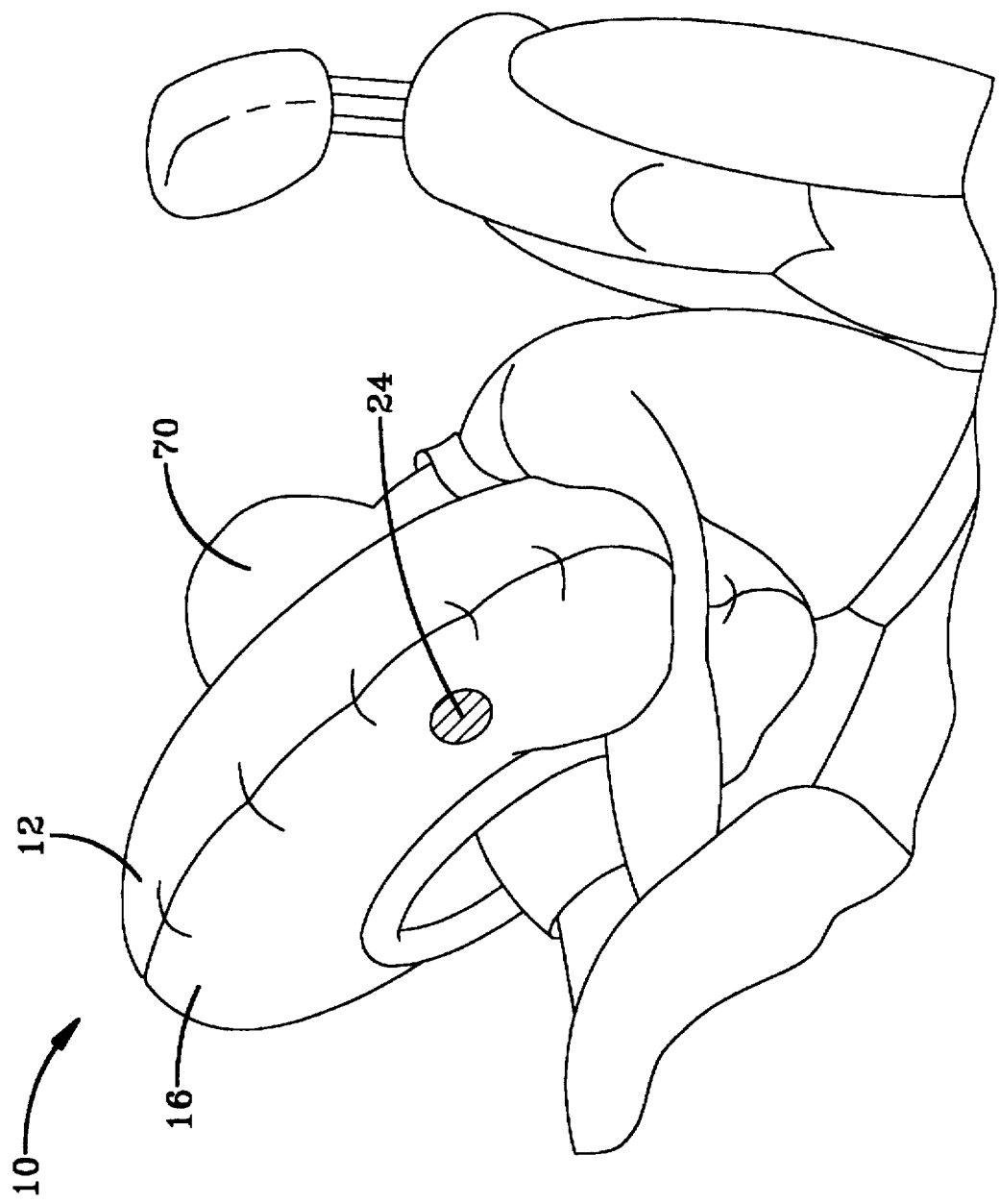
FIG. 1 is a pictorial view of an inflatable airbag of the present invention used in an occupant protection system.

Referring now to the drawings wherein the showings are for purposes of illustrating preferred embodiments of the invention only and not for purposes of limiting the same, FIG. 1 shows an airbag 10, which is a component of a vehicle occupant protection system, in an inflated condition to protect a vehicle occupant 70. The airbag 10 comprises airbag material 12 having an outer surface 16, an inner surface, and a sealing member 24 overlying a ventilation opening 30 in the airbag material.

As used herein and in the claims the term "airbag material" is understood to mean any suitable coated or uncoated woven fabric as well as nonwoven films that may be used for an airbag.

As used herein and in the claims terms such as "inner", "inner surface" and "inwardly" are understood to be used to refer to surfaces or directions with respect to their proximity to the inflation chamber which exists when an airbag is inflated with the inflation chamber on the inside of the airbag material. Furthermore, as used herein and in the claims terms such as "outer", "outer surface" and "outwardly" are understood to be used to refer to surfaces or directions with respect to their opposition to the inflation chamber which exists when an airbag is inflated with the inflation chamber on the inside of the airbag material.

With reference to FIGS. 2 and 3, wherein FIG. 2 is a a fragmentary plan view of an airbag having a ventilation mechanism according to the invention and FIG. 3 is a side cross sectional view of a ventilation mechanism in an airbag according to the invention, a sealing member 24 is secured about the peripheral edge 34 of a ventilation opening 30 to inhibit the ventilation of inflation gas (not shown) from the airbag. Although the ventilation opening 30 is represented by a circle in FIG. 2, it should be understood that the invention can be successfully practiced with a ventilation opening 30 which is square, rectangular, oval or any other shape.

The sealing member 24 may be secured to the airbag material 12 by a variety of securing means. For example, in one preferred embodiment, shown in FIG. 3 the securing means includes a flange 46 extending from the inner side 48 of sealing member 24. The flange 46 includes a back wall 49 and a side wall 50. The side wall 50, back wall 49 and an overlap region 51 of sealing member 24 define a channel 52 having a U-shaped cross-section. The channel 52 receives the peripheral edge 34 of the ventilation opening 30 for securing the sealing member 24 to the airbag material 12. In this embodiment, the sealing member 24 can be thermoplastically molded to the airbag material 12 using a manufacturing process commonly known as injection molding or insert molding.

With reference to FIG. 2, an important aspect of the invention is the inclusion of a frangible region 40 in sealing member 24. As used herein and in the claims the term "frangible" is understood to mean easily broken. The frangible region 40 of the sealing member is located at least partially in juxtaposition with the ventilation opening 30. Put another way, at least part of the frangible region 40 of the sealing member is located side by side with, and overlying, the ventilation opening 30. The frangible region 40 of the sealing member remains intact as the airbag 10 is inflating until the inflation pressure reaches a predetermined maximum level. The frangible region 40 of the sealing member breaks open when the inflation pressure reaches or exceeds the predetermined level.

When the frangible region 40 of the sealing member breaks open, one or more flaps 44 are formed in sealing member 24 and move outwardly from the airbag 10. For example, FIG. 4 shows one embodiment of the invention in which the frangible region 40 of the sealing member has been broken open by the inflation pressure and a resulting flap 44 is in a venting position. The line where the frangible region 40 of the sealing member broke is defined by terminal edges 56A and 56B. The inflation gas is vented through the ventilation opening 30 as shown by the arrow 60.

The sealing member 24 with a frangible region 40 cooperates with the ventilation opening 30 to form a pressure-sensitive airbag ventilation mechanism 45. The sealing member 24 retains the inflation gas within the airbag 10 unless the inflation pressure reaches or exceeds a predetermined maximum level.

An airbag in accordance with the present invention has been manufactured wherein the airbag material was a silicone coated nylon and the sealing member comprised a thermoplastic polyolefin which was sewed to the airbag material to seal a circular ventilation opening having a diameter of about 55 mm. While the sealing member is preferably a plastic or polymeric sealing member attached to the airbag fabric by insert molding; it is understood that the sealing member may be made of any suitable plastic, polymeric material, woven or nonwoven fabric, or any other suitable material which is attached to the airbag material by any suitable securing means including for example sewing, adhesives, fasteners, heat staking and so forth.

Referring again to FIG. 4, in another embodiment the securing means comprises a sealing member with an extension 62 which protrudes from the inner side 48 of the sealing member 24 and extends through an opening 64 in the airbag material 12 in the region adjacent the ventilation opening 30. The inner side 48 of the sealing member 24 includes a region 51 of the sealing member which overlaps and is secured to the outer surface 16 of the airbag material 12 around the peripheral edge 34 of ventilation opening 30. Such securement can be via any conventional means chosen with sound engineering judgment as discussed in the immediately preceding paragraph.

Figure 5:
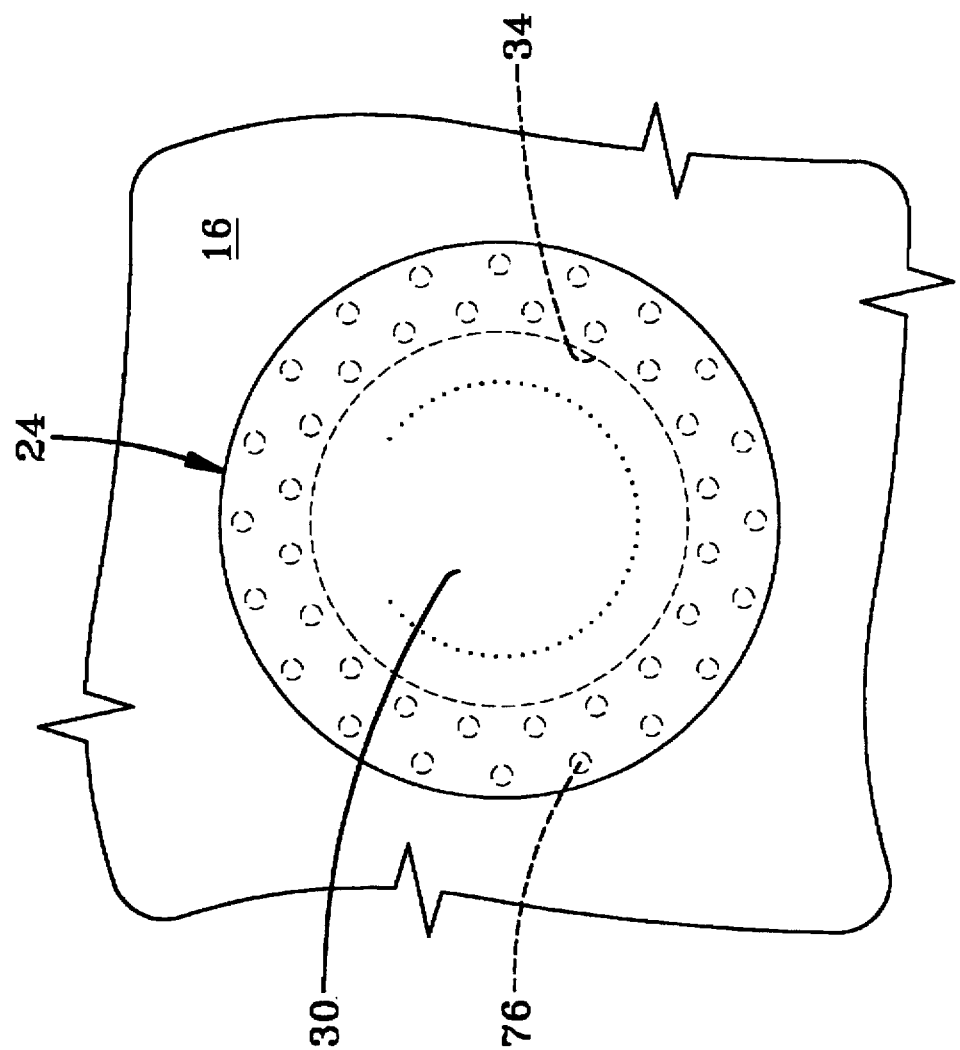
FIG. 5 is a a fragmentary plan view of an airbag having a ventilation mechanism according to another embodiment of the invention.

In yet another embodiment, shown in FIG. 5, the securing means includes heat sealing a region 76 of a sealing member 24 which overlaps the outer surface 16 of the airbag material 12 around the peripheral edge 34 of the ventilation opening 30.

With reference to FIG. 1, when the airbag 10 is deployed, an inflation gas is introduced into the interior of the airbag 10. If the vehicle collision is such so as to quickly decelerate the vehicle, such as in a head-on collision, the vehicle occupant 70 moves forward against the airbag 10. The action of the inflation gas filling the airbag 10 and the action of the vehicle occupant 70 against the airbag 10 cause the pressure within the airbag 10 to increase.

As shown in FIG. 4, when the inflation pressure reaches a predetermined maximum level, the frangible region 40 of the sealing member 24 breaks. The inflation pressure moves a flap 44 in the frangible region outwardly so that the ventilation opening 30 is no longer sealed. The inflation gas is vented through the unsealed ventilation opening 30 so that the airbag 10 presents a more compliant surface to the occupant 70.

With reference to FIGS. 6A–6G, the frangible region 40 of a sealing member may include a series of indentations or perforations 72 located along weakening lines 76A, 76B, 76C, 76D, 76E, 76F and 76G to weaken the sealing member 24. Indentations 72 may be perforations which extend either partially or totally through the sealing member 24. Alternatively, the weakening line may be formed by molding or pressing a groove into the sealing member to weaken it in a desired pattern and create a frangible region. Between adjacent indentations or perforations 72, the sealing member 24 remains intact as the inflation pressure increases but upon attaining the predetermined maximum inflation pressure level, the sealing member 24 tears or breaks along the weakening line, or lines, 76A–76G. The positioning of weakening lines 76A–76G determines the number of flaps formed when the frangible region 40 is opened.

Figures 7, 8:
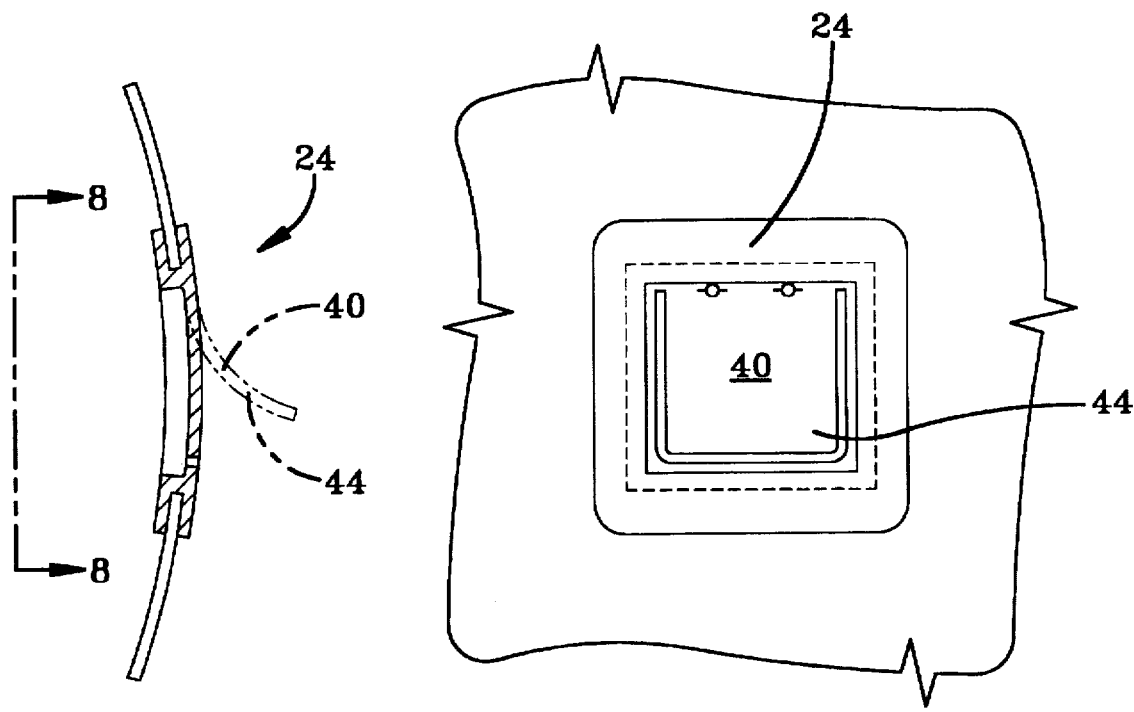
FIG. 7 is a side, cross sectional view of another embodiment of a ventilation mechanism according to the present invention, shown with the frangible region opened in discontinuous lines.
FIG. 8 is a fragmentary plan view of an airbag having a ventilation mechanism according to the embodiment of the invention shown in FIG. 7; and, FIG. 9 is a fragmentary plan view of an airbag having a ventilation mechanism according to yet another embodiment of the invention.
Figure 9:
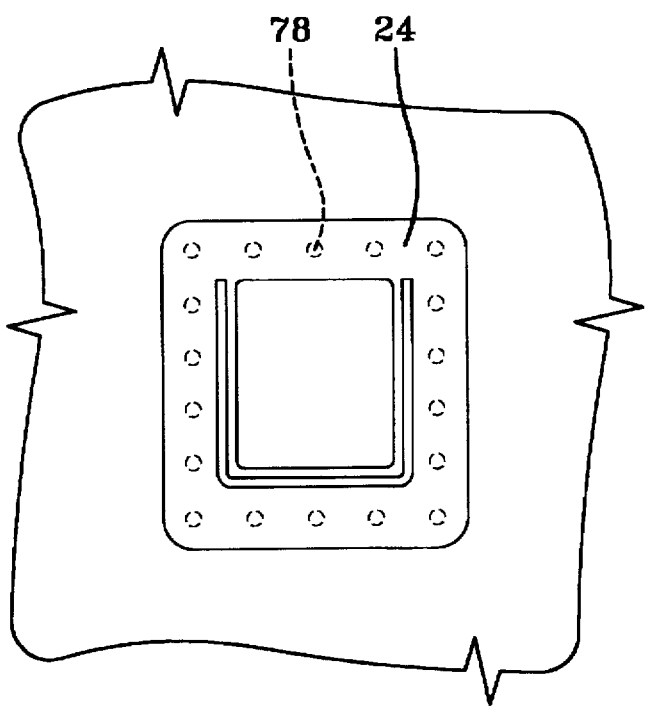

With reference to FIGS. 7 and 8, an alternate embodiment of the invention is illustrated with the flap 44 of the frangible region 40 of the sealing member 24 shown in dotted lines as it would open. In FIG. 9, another embodiment of the invention is illustrated. In this embodiment, spot welds 78 are used to secure the sealing member 24 to the airbag 10. These spot welds 78 can be provided by several different methods, including heat staking.

In a preferred method for venting an airbag 10, the airbag 10 is formed from an airbag material 12 which is chosen with regard to current, sound engineering judgment. The airbag material 12 is provided with at least one ventilation opening 30. A sealing member 24 is secured to the airbag material 12 and overlies the ventilation opening 30 to inhibit the venting of inflation gas from the airbag 10. The sealing member 24 is provided with a frangible region 40 which overlies at least a part of the ventilation opening 30. During deployment of the airbag 10 inflation gas (not shown) is directed into an inflation chamber defined by an inner surface 20 of the airbag 10. After the inflation pressure attains a predetermined level, the frangible region 40 of the sealing member 24 breaks. The inflation gas is then vented through the ventilation opening 30.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. An inflatable airbag comprising:
   airbag material having an outer surface and an inner surface, said inner surface defining an inflation chamber into which inflation gas is directed to inflate the airbag, said airbag material having a ventilation opening therein for venting inflation gas from the inflation chamber;
   a sealing member extending across and sealing the ventilation opening to inhibit said inflation gas from venting from said inflation chamber, said sealing member having a frangible region with a weakening line located at least partially over said ventilation opening, the frangible region of the sealing member being intact when the inflation pressure in said inflation chamber is below a predetermined level with the sealing member retaining the inflation gas within the airbag unless the inflation pressure reaches or exceeds said predetermined level, said frangible region capable of breaking open when the inflation pressure in said inflation chamber equals or exceeds said predetermined level; and,
   securing means for securing said sealing member to said airbag material.

2. The airbag of claim 1 wherein said frangible region has a series of indentations therein forming a weakening line.

3. The airbag of claim 1 wherein said sealing member includes an overlap region on an inner side thereof, said overlap region being in contact with said outer surface of said airbag material near a peripheral edge of the ventilation opening.

4. The airbag of claim 3 wherein said securing means comprises a flange extending from said inner side of said sealing member, said flange comprising a back wall and a side wall, said side wall being essentially parallel to said overlap region, said overlap region, side wall and back wall defining a U-shaped channel for receiving therein the peripheral edge of said ventilation opening for securing said sealing member to said airbag material.

5. The airbag of claim 3 wherein said securing means has welds securing said overlap region to said airbag material, said welds being formed by heat sealing.

6. The airbag of claim 3 wherein said securing means has a sealing member extension which protrudes from an inner side of said sealing member and extends through an opening in the airbag material in a region adjacent the ventilation opening.

7. An airbag ventilation mechanism used with an airbag, said airbag being formed of airbag material and having an outer surface and an inner surface, said inner surface defining an inflation chamber capable of receiving inflation gas for inflating said airbag, said ventilation mechanism comprising:
   a sealing member extending across and sealing a ventilation opening in the airbag material to inhibit said inflation gas from venting from said inflation chamber, said sealing member having a frangible region with a weakening line at least partially located over said ventilation opening, said frangible region being intact when the inflation pressure in said inflation chamber is less than a predetermined level with the sealing member retaining the inflation gas within the airbag unless the inflation pressure reaches or exceeds said predetermined level, and said frangible region being broken open when the inflation pressure is equal to or greater than said predetermined level; and,
   securing means for securing said sealing member to said airbag material.

8. The airbag ventilation mechanism of claim 7 wherein said sealing member has an overlap region on an inner side thereof, said overlap region being in contact with said outer surface of said airbag material near a peripheral edge of the ventilation opening.

9. The airbag of claim 8 wherein said securing means comprises a flange extending from said inner side of said sealing member, said flange comprising a back wall and a side wall, said side wall being essentially parallel to said overlap region, said overlap region, side wall and back wall defining a U-shaped channel for receiving therein the peripheral edge of said ventilation opening for securing said sealing member to said airbag material.

10. The airbag ventilation mechanism of claim 8 wherein said securing means comprises welds securing the overlap region of the sealing member to said airbag material, said welds being formed by heat sealing.

11. The airbag ventilation mechanism of claim 7 wherein said frangible region has a series of indentations therein which form a weakening line.

12. The airbag ventilation mechanism of claim 7 wherein said sealing member comprises a flap formed when said frangible region is broken open, said flap being directed away from said airbag to allow said inflation gas to vent from said inflation chamber.

13. An inflatable airbag comprising:
   airbag material having an outer surface and an inner surface, said inner surface defining an inflation chamber into which inflation gas is directed to inflate the airbag, said airbag material having a ventilation opening therein for venting inflation gas from the inflation chamber;

a plastic sealing member extending across and sealing the ventilation opening to inhibit said inflation gas from venting from said inflation chamber, said plastic sealing member having a frangible region with a weakening line located at least partially over said ventilation opening, the frangible region of the plastic sealing member being intact when the inflation pressure in said inflation chamber is below a predetermined level with the plastic sealing member retaining the inflation gas within the airbag unless the inflation pressure reaches or exceeds said predetermined level, said frangible region capable of breaking open when the inflation pressure in said inflation chamber equals or exceeds said predetermined level; and, securing means for securing said plastic sealing member to said airbag material.

14. The airbag of claim 13 wherein said frangible region of the plastic sealing member has a series of indentations therein forming a weakening line.

15. The airbag of claim 13 wherein said plastic sealing member includes an overlap region on an inner side thereof, said overlap region being in contact with said outer surface of said airbag material near a peripheral edge of the ventilation opening.

16. The airbag of claim 15 wherein said securing means comprises a flange extending from said inner side of said sealing member, said flange comprising a back wall and a side wall, said side wall being essentially parallel to said overlap region, said overlap region, side wall and back wall defining a U-shaped channel for which has the peripheral edge of said ventilation opening secured therein.

17. The airbag of claim 15 wherein said securing means comprises welds securing the overlap region of the plastic sealing member to said airbag material, said welds being formed by heat sealing.

18. An inflatable airbag comprising:

airbag material having an outer surface and an inner surface, said inner surface defining an inflation chamber into which inflation gas is directed to inflate the airbag, said airbag material having a ventilation opening therein for venting inflation gas from the inflation chamber;

a plastic sealing member insert molded with said airbag material and extending across and sealing the ventilation opening to inhibit said inflation gas from venting from said inflation chamber, said sealing member having a frangible region with a weakening line located at least partially over said ventilation opening, the frangible region of the sealing member being intact when the inflation pressure in said inflation chamber is below a predetermined level with the plastic sealing member retaining the inflation gas within the airbag unless the inflation pressure reaches or exceeds said predetermined level, said frangible region capable of breaking open when the inflation pressure in said inflation chamber equals or exceeds said predetermined level.

* * * * *